US012808360B2

(12) United States Patent
Vapnar et al.

(10) Patent No.: US 12,808,360 B2
(45) Date of Patent: Nov. 24, 2026

(54) LINEAR COMPRESSOR WITH A LINEAR ELECTRIC MOTOR AND HOUSEHOLD APPLIANCE

(71) Applicant: BSH Hausgeräte GmbH, Munich (DE)

(72) Inventors: Jozef Vapnar, Michalovce (SK); Robert Blaz, Humenne (SK); Matus Bocinec, Michalovce (SK)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 19/270,562

(22) Filed: Jul. 16, 2025

(65) Prior Publication Data

US 2026/0031694 A1 Jan. 29, 2026

(30) Foreign Application Priority Data

Jul. 24, 2024 (EP) .................................... 24190505

(51) Int. Cl.
*F04B 35/04* (2006.01)
*H02K 33/18* (2006.01)

(52) U.S. Cl.
CPC ........... *F04B 35/045* (2013.01); *H02K 33/18* (2013.01)

(58) Field of Classification Search
CPC ....... F04B 35/045; F04B 17/04; H02K 33/02; H02K 33/18; H02K 1/12
See application file for complete search history.

(56) References Cited

U.S. PATENT DOCUMENTS 8,876,497 B2 11/2014 Kim
2024/0263625 A1* 8/2024 Fiedler .................... F04B 17/03

FOREIGN PATENT DOCUMENTS

CN 104048437 A 9/2014
EP 0479443 A1 4/1992
EP 3699426 A1 * 8/2020 ............ F04B 35/045

* cited by examiner

*Primary Examiner* — Nathan C Zollinger
(74) *Attorney, Agent, or Firm* — Laurence A. Geenberg; Werner H. Stemer; Ralph E. Locher

(57) ABSTRACT

A linear compressor for a household appliance, for instance a refrigerator, includes a yoke-magnet-arrangement clamped on a cylinder of a cylinder-piston arrangement in such a way that temperature expansions of the yoke-magnet-arrangement are enabled. In particular, a spring force forces the yoke-magnet-arrangement against a fixed stop of the cylinder. A household appliance having the linear compressor is also provided.

11 Claims, 5 Drawing Sheets

LINEAR COMPRESSOR WITH A LINEAR ELECTRIC MOTOR AND HOUSEHOLD APPLIANCE

CROSS-REFERENCE TO RELATED APPLICATION

This application claims the priority, under 35 U.S.C. § 119, of European Patent Application EP 24190505, filed Jul. 24, 2024; the prior application is herewith incorporated by reference in its entirety.

FIELD AND BACKGROUND OF THE INVENTION

The present invention relates to a linear compressor for a household appliance including a linear electric motor having a stator with a coil and a movable system. The present invention also relates to a household appliance.

Several linear compressors with linear electric motors are known from the prior art. U.S. Pat. No. 8,876,497 B2 discloses a linear compressor including a cylinder having a compression space for refrigerant therein, a piston that reciprocates linearly within the cylinder in an axial direction to compress the refrigerant, and a frame having a mounting hole so that one end of the cylinder can be mounted thereon and a deformation preventing portion in a portion around the mounting hole that is brought into contact with the one end of the cylinder. Even if the size of the cylinder is increased and the size of the frame is limited, the frame obtains sufficient strength to support the cylinder, thereby reducing mounting deformations and improving operational reliability. One disadvantage of that linear compressor is that the linear compressor is subject to strong temperature changes due to the compression of the coolant, which can damage the moving parts of the linear compressor. That can shorten the service life of the linear compressor.

SUMMARY OF THE INVENTION

It is accordingly an object of the invention to provide a linear compressor with a linear electric motor as well as a household appliance having a reliable compressor, which overcome the hereinafore-mentioned disadvantages of the heretofore-known devices of this general type and which ensure reliable operation even in the event of severe temperature changes.

With the foregoing and other objects in view there is provided, in accordance with the invention, a linear compressor for a household appliance, comprising a linear electric motor having a stator with a coil and a movable system (mover). The movable system is movable in axial direction. It includes a yoke-magnet-arrangement, a cylinder and a spring. The yoke-magnet-arrangement has an annular yoke which is disposed on the cylinder and carries a magnetic ring. Via the spring, the yoke-magnet-arrangement is pressed against an unmovable stop on the cylinder limiting an axial movement of the yoke-magnet-arrangement on the cylinder at one side. The yoke has a shoulder facing the unmovable stop and limiting an axial movement of the magnetic ring on the yoke at the other side.

The cylinder of the linear compressor can move along a linear path to minimize friction and reduce energy loss during motion conversion compared to conventional compressors. This technology has been successfully used in cryogenic applications, which can be oil-free. The linear compressor with a valve therefore enables the use of compact heat exchangers. The linear compressor can be connected to alternating current, for example by using a diode. The cylinder can be spring-loaded and moved relative to a fixed piston by using the mover, which is driven by the linear electric motor. During a positive cycle of the alternating current, the diode allows current to flow through the stator's electromagnet and creates a magnetic field which acts on the mover and consequently moves the cylinder backwards away from the piston, compressing the spring and consequently creating suction so that the gas medium or coolant is drawn into a compression chamber. During a negative cycle of the alternating current, the diode can block the current flow to the stator's electromagnet, which relaxes the spring, moves the piston forward and compresses the refrigerant. The compressed refrigerant can then be discharged via a valve to achieve the desired cooling effect. Preferably, the coil has a cylindrical shape. The magnetic ring can be a permanent magnet. The yoke is used to distribute the magnetic field so that the driving force of the linear electric motor is amplified.

With the objects of the invention in view, there is also provided a preferred household appliance having a linear compressor according to the invention. An exemplary household appliance is a refrigerator.

If the spring acts directly on the yoke, the number of parts is reduced and a response behavior of the system is optimized.

Preferably, the spring is a ring and has a wave-like shape. In this way, a compact configuration is realized. Alternatively, spiral or coil springs are preferred.

In addition, the spring can be a retaining ring which is disposed in a cylinder groove. In this way, a technically easy and reliable arrangement of the spring is realized.

Alternatively, the spring is a ring which is held in place on the cylinder via an insert which surrounds the cylinder and acts as a spring support. In this way, no groove has to be provided in the cylinder. Furthermore, the insert can help centering the ring on the cylinder.

In one embodiment, the yoke is split into two annular yoke parts each having a shoulder for limiting an axial movement of the magnetic ring. In this way, the magnetic ring is fixed axially by two opposing yoke shoulders.

In order to avoid any axial movement of the magnetic ring on the yoke, an axial extension of a receiving area for the magnetic ring is less than an axial extension of the magnetic ring.

In another embodiment, the yoke has a tube-like section for receiving the magnetic ring, wherein its axial extension is less than the axial extension of the magnetic ring. In this way, only one shoulder for the magnetic ring is provided by the yoke. The second shoulder is the unmovable stop of the cylinder.

In a further embodiment, the yoke has a tube-like section with axial projections at its front face. The projections are adapted to be passed between radial projections of the cylinder which are spaced apart from another in circumferential direction and which form the unmovable stop of the cylinder. In this way, a rotation of the yoke on the cylinder is prevented.

In order to avoid any axial movement of the magnetic ring on the yoke, the tube-like section for receiving the magnetic ring has an axial extension which is less than the axial extension of the magnetic ring.

Other features which are considered as characteristic for the invention are set forth in the appended claims.

Although the invention is illustrated and described herein as embodied in a linear compressor with a linear electric motor, and a household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

As is to be understood, the various elements and components are depicted as examples only, and they may be facultative and/or combined in a manner different than that depicted.

DETAILED DESCRIPTION OF THE INVENTION

Figure 1:
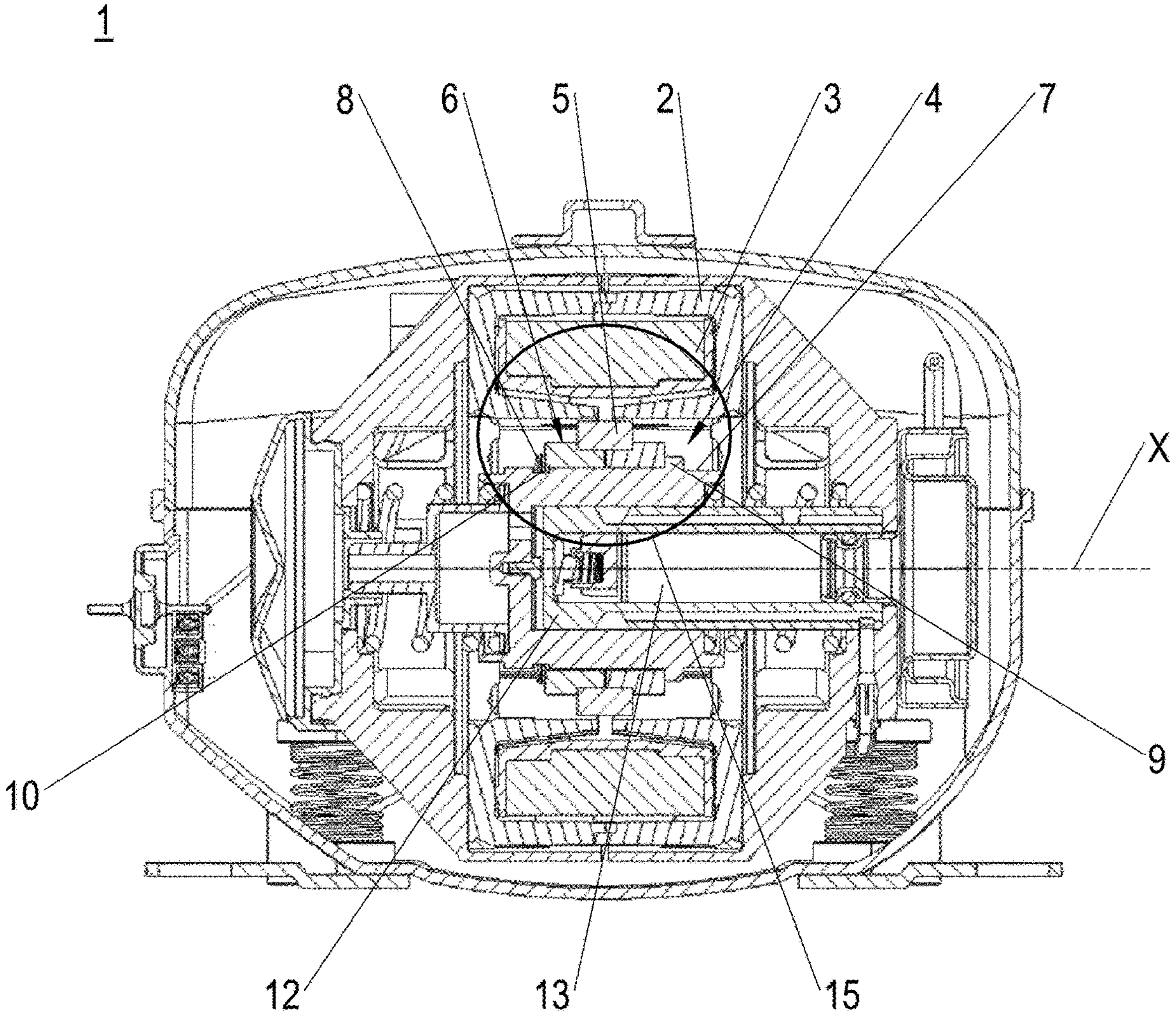
FIG. 1 is a diagrammatic, cross-sectional view of a linear compressor with a linear electric motor.
Figure 2A:
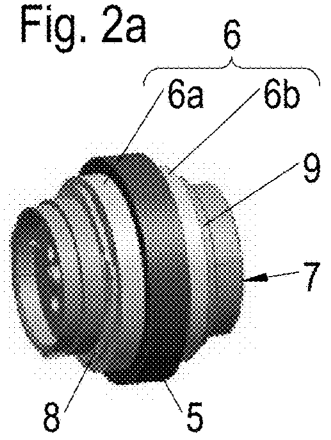
FIGS. 2*a* to 2*d* are enlarged, perspective, elevational and sectional views of a first embodiment of a yoke-magnet arrangement of the linear compressor of FIG. 1.
Figure 2B:
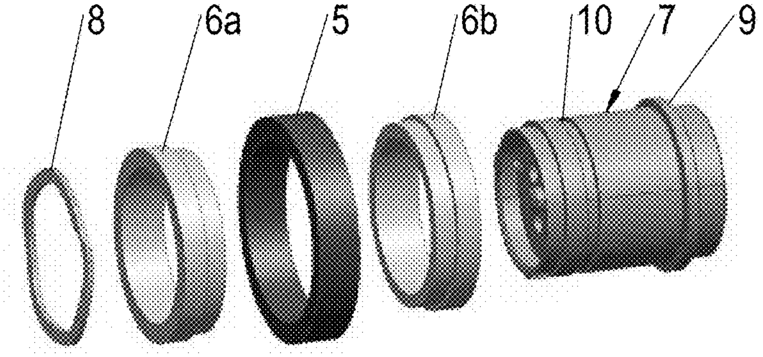
Figure 2C:
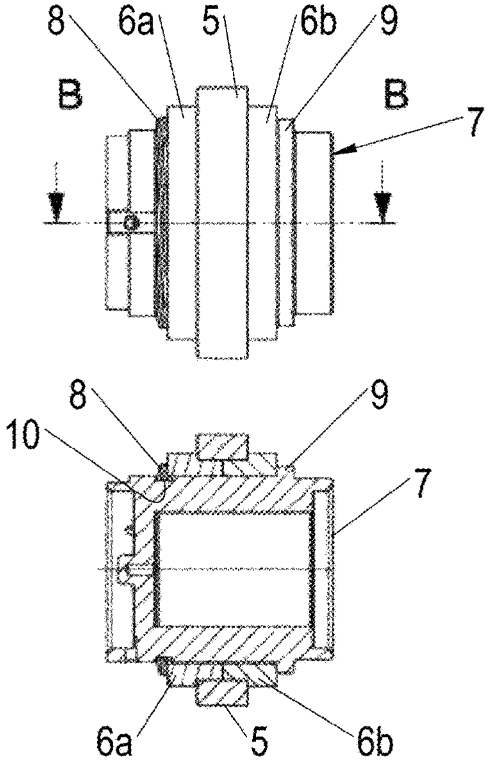
Figure 2D:
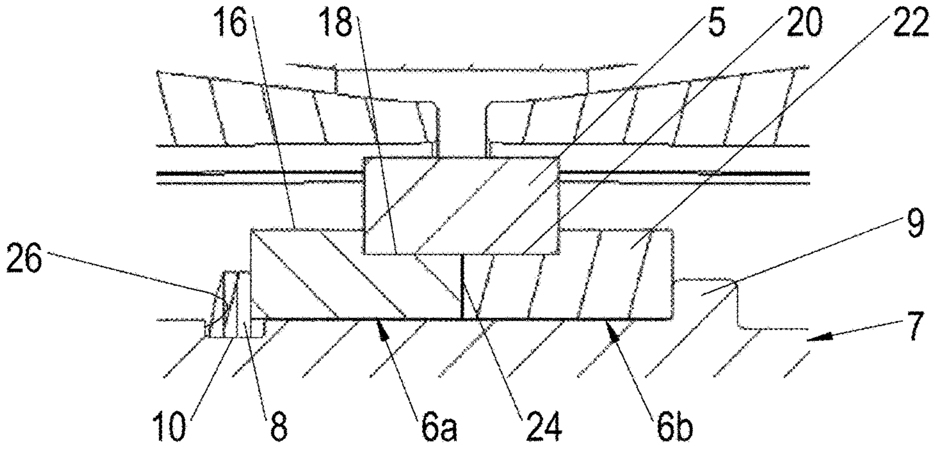
Figure 3A:
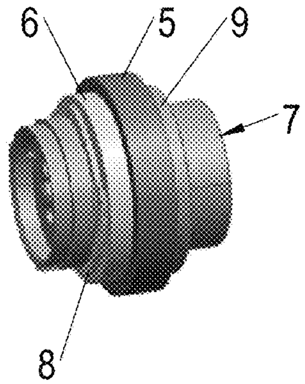
FIGS. 3*a* to 3*d* are enlarged, perspective, elevational and sectional views of a second embodiment of a yoke-magnet arrangement of the linear compressor of FIG. 1.
Figure 3B:
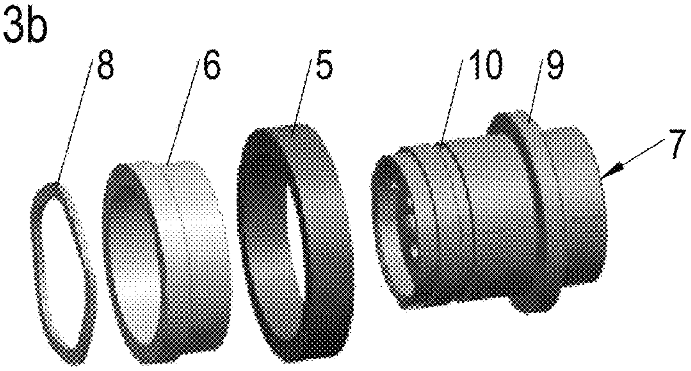
Figure 3C:
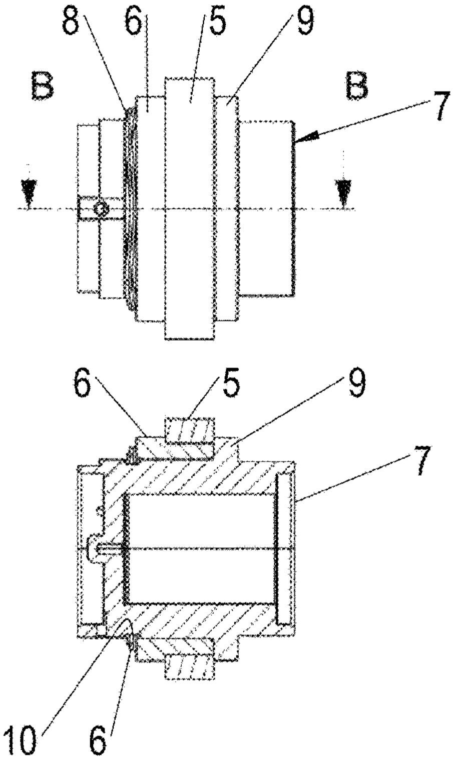
Figure 3D:
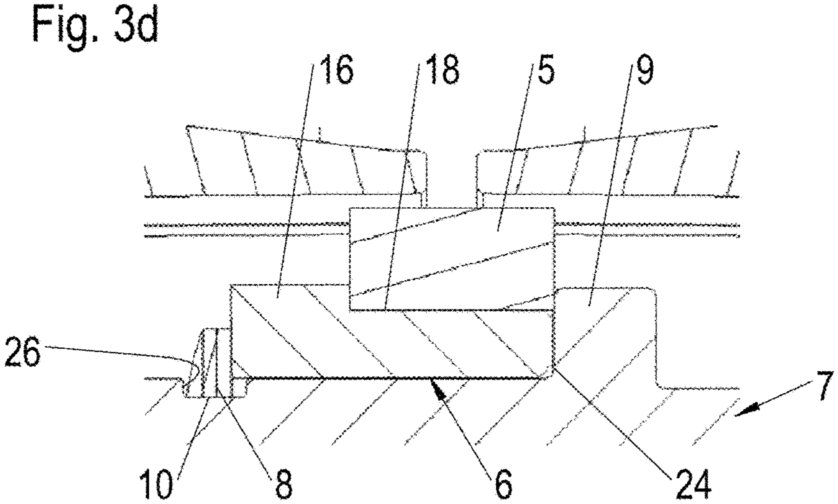
Figure 4A:
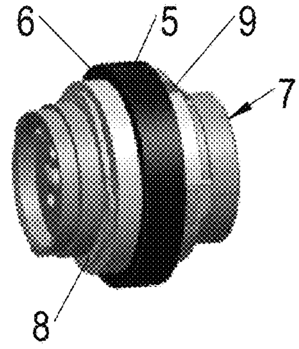
FIGS. 4*a* to 4*d* are enlarged, perspective, elevational and sectional views of a third embodiment of a yoke-magnet arrangement of the linear compressor of FIG. 1.
Figure 4B:
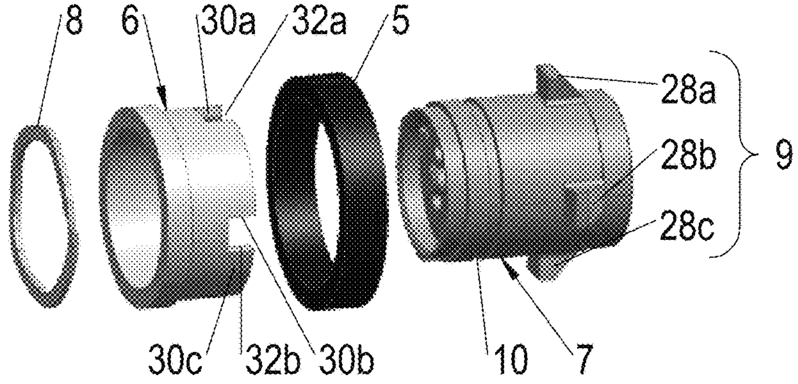
Figure 4C:
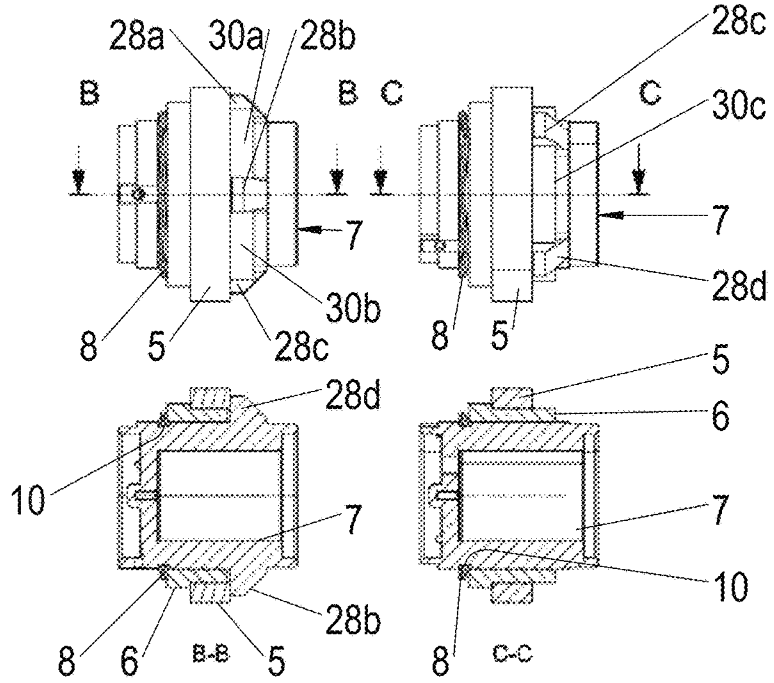
Figure 4D:
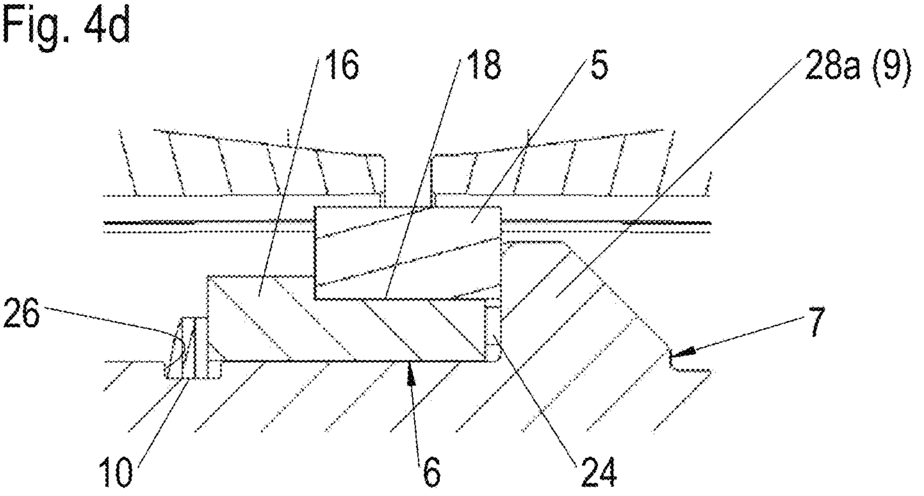

Referring now in detail to the figures of the drawings, in which reference signs for related elements are used comprehensively and are not defined again for each figure, and first, particularly, to FIG. 1 thereof, there is seen a diagrammatic representation of a linear compressor 1 with a linear electric motor. A preferred household appliance having such linear compressor is a refrigerator.

The linear electric motor includes a stator 2 with a coil 3 and a movable system (mover) 4. The movable system 4 is movable in axial direction x. It includes a yoke-magnet arrangement (5, 6), a cylinder 7 and a spring 8.

The yoke-magnet-arrangement includes an annular yoke 6 which is disposed on the cylinder 7 and a magnetic ring 5. The magnetic ring 5 is positioned on the yoke 6 within the magnetic field. The magnetic ring 5 is a permanent magnet.

The spring 8 is pressed against an unmovable stop 9 on the cylinder 7 and limits an axial movement of the yoke-magnet-arrangement on the cylinder 7 at one side, which in this case is the right side according to the illustration.

Figure 5A:
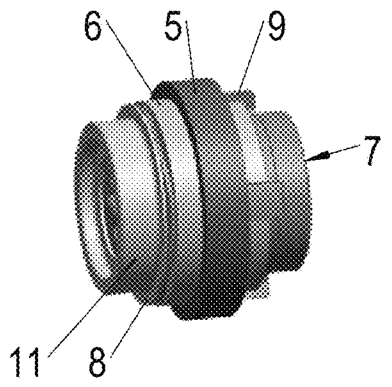
FIGS. 5*a* to 5*d* are enlarged, perspective, elevational and sectional views of a fourth embodiment of a yoke-magnet arrangement of the linear compressor of FIG. 1.
Figure 5B:
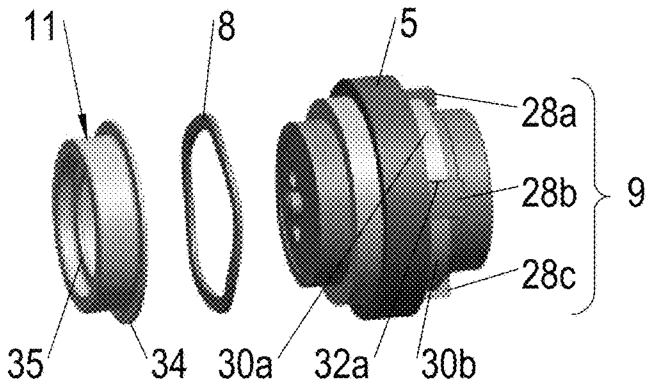
Figure 5C:
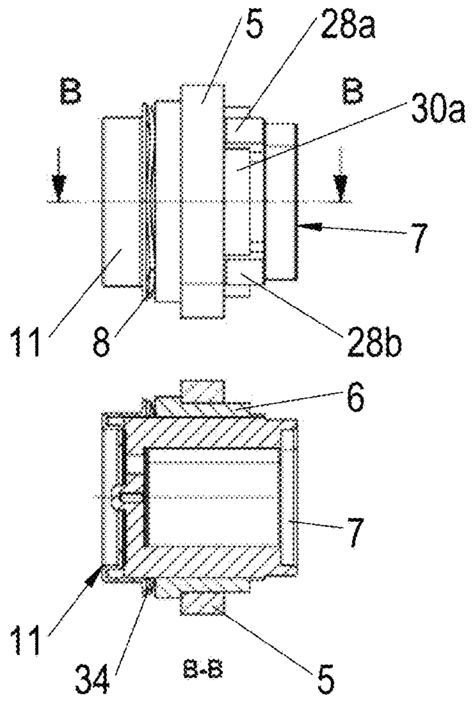
Figure 5D:
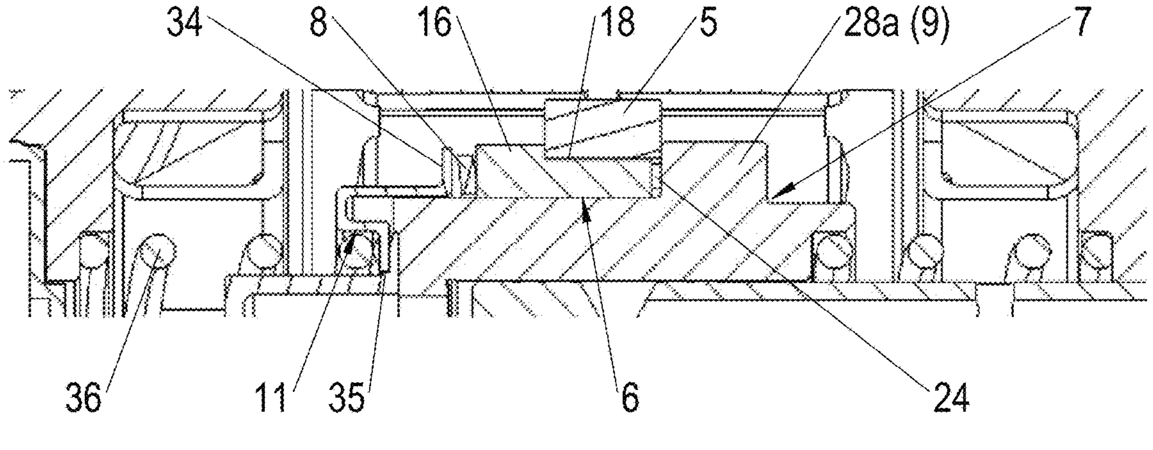

In the first embodiment shown in FIG. 1, the spring 8 is an opened retaining ring with a wave-like shape and is disposed in an annular groove 10 in an outer surface of the cylinder 7. However, as shown in FIGS. 5*a* to 5*b*, the spring 8 can also be a closed wave ring which is held in place via an insert 11 surrounding the cylinder 7 and acting as a spring support.

The yoke 6 has a (counter-) shoulder 16 facing the unmovable stop 11 and limiting an axial movement of the magnetic ring 5 on the yoke 6 at the other side which in this case is the left side according to the illustration.

A piston 12 is disposed inside the cylinder 7, whereby a gas medium or a coolant is compressed in a chamber 13 between the piston 12 and the cylinder 7 by an oscillating movement of the cylinder 7 relative to the stationary piston 12.

Preferred embodiments of a circled area 15 are explained in detail with reference to FIGS. 2*a*-2*d*, 3*a*-3*d*, 4*a*-4*d* and 5*a*-5*d*.

According to the first embodiment of the movable system 4, shown in FIGS. 1 and 2*a* to 2*d*, the yoke-magnet-arrangement includes a yoke 6 which is split into two parts 6*a*, 6*b* along a vertical plane z. The yoke parts 6*a*, 6*b* are symmetrical to the vertical plane z. Both include a tube-like section 18, 20 for receiving the magnetic ring 7 and a radial outer shoulder 16, 22 for positioning the magnetic ring 5 axially on the tube-like sections 18, 20. If the annular yoke parts 6*a*, 6*b* are put together, an axial extension of a receiving area formed by the two tube-like sections 18, 20 for the magnetic ring 5 is less than an axial extension of the magnetic ring 5. Between the yoke parts 6*a*, 6*b* a gap 24 can be provided for tolerance compensation of the yoke parts 6*a*, 6*b* and the magnetic ring 5, for instance. In order to avoid any negative impact on the electromagnetic field distribution, the gap 24 between the yoke parts 6*a*, 6*b* is minimized as far as possible, whereas tolerance compensation of the yoke-magnet-arrangement remains.

The cylinder 7 has a radial outer shoulder forming the unmovable stop 9. The annular groove 10 is provided in the cylinder 7 adapted to receive the spring 8, at an axial distance from the unmovable stop 9.

The spring 8 is a wave-shaped retaining ring which is adapted to be inserted into the annular groove 10.

The axial distance between the unmovable stop 9 and the groove 10 is such that thermal expansions of the yoke-arrangement and/or the cylinder 7 can be balanced. The unmovable stop 9 of the cylinder 7 defines a rigid shoulder in the right direction whereas due to the elastic counter-stop released by the spring 8, the yoke-magnet-arrangement can expand slightly to the left, such that thermal stress is avoided. Thereby, the yoke-magnet-arrangement always has a defined axial position as it is forced against the unmovable stop 9 by the spring 8.

In the assembled state, the magnetic ring 5 is positioned on the tube-like sections 18, 20 of the yoke parts 6*a*, 6*b* and clamped between their shoulders 16, 22. These yoke parts 6*a*, 6*b* are clamped between the unmovable stop 9 and the retaining ring 8 (spring). Thereby, due to the retaining ring 8 (spring) the yoke-magnet-arrangement (5, 6*a*, 6*b*) can move slightly in axial direction x which allows a tolerance compensation due to temperature changes, for instance.

In other words, the first embodiment has a single wave retaining ring as the spring 8, and two symmetrically and equal yokes parts 6*a*, 6*b* which in their assembled state axially extend over the magnetic ring 5. The wave retaining ring 8 is supported against a groove wall 26 and applies an axial pressure force in the direction toward the unmovable stop 9, in particular against the first yoke part 6*a*, from the first yoke part 6*a* to the magnetic ring 5, via the magnetic ring 5 to the second yoke part 6*b* and via the second yoke part 6*b* to the unmovable stop 9.

According to a second embodiment of the movable system 4, shown in FIGS. 3*a* to 3*d*, the yoke-magnet-arrangement includes a single piece yoke 6. The yoke 6 has a tube-like section for receiving the magnetic ring 5 and a radial outer shoulder 16 for limiting a movement of the magnetic ring 5 axially to the left side on the tube-like section 18. An axial extension of a receiving area formed by the tube-like section 18 for the magnetic ring 5 is less than an axial extension of the magnetic ring 5 such that in an assembled state a gap 24 is established between the unmovable stop 9 and the yoke 6.

The cylinder 7 also has an annular groove 10 for receiving the spring 8, which in this embodiment is a retaining ring as well.

In the assembled state, the magnetic ring 5 is positioned on the tube-like section 18 and clamped between the unmovable stop 9 of the cylinder 7 and the spring 8 (retaining ring) in the groove 10. Thereby, due to the retaining ring 7 (spring) the yoke-magnet arrangement (5, 6) can move slightly in axial direction x which allows a tolerance compensation due to temperature changes, for instance.

In other words, the second embodiment has a single wave retaining ring as the spring 8 as well, but a single piece yoke 6. The tube-like section 18 of the yoke 6 does not extend the magnetic ring 5 axially. The wave retaining ring 8 applies an axial pressure force against the groove wall 26 in the cylinder 7, and against the yoke-magnet-arrangement (5, 6) forcing the magnetic ring 5 against the unmovable stop 9, in particular against the yoke 6, from its shoulder 16 to the magnetic ring 5 and via the magnetic ring 5 to the unmovable stop 9. Since the yoke 6 does not have a right shoulder, the magnetic ring 5 is in direct contact with the unmovable stop 9.

According to a third embodiment of the movable system 4, shown in FIGS. 4*a* to 4*d*, the yoke-magnet-arrangement includes a single piece yoke 6 as well. The yoke 6 also has a tube-like section 18 for receiving the magnetic ring 5 and a radial outer shoulder 16 for positioning the magnetic ring 5 axially on the tube-like section 18.

In contrast to the second embodiment, the unmovable stop 9 of the cylinder 7 is not a radial outer shoulder, but has several radial projections 28*a*, 28*b*, 28*c*, 28*d* which are distributed evenly over the circumference of the cylinder 7. In this case, four radial projections 28*a*, 28*b*, 28*c*, 28*d* are provided. In order to interact with these teeth-like radial projections 28*a*, 28*b*, 28*c*, 28*d*, the pipe-section 18 of the yoke 6 has at its front face a plurality of axial projections 30*a*, 30 defining recesses 32*a*, 32*b* between them. In this case, four radial projections 28*a*, 28*b*, 28*c*, 28*d*, four axial projections 30*a*, 30*b* and four recesses 32*a*, 32*b* are provided. The recesses 32*a*, 32*b* have such an extension in circumferential direction that the radial projections 28*a*, 28*b*, 28*c* of the cylinder 7 can be inserted during assembly. An axial extension of a receiving area formed by the tube-like section 18 for the magnetic ring 5 is less than an axial extension of the magnetic ring 5 such that in an assembled state a gap 24 is established between the unmovable stop 9 and the yoke 6.

The cylinder 7 also has an annular groove 10 for receiving the spring 8, which in this embodiment is a retaining ring as well.

In the assembled state, the magnetic ring 5 is positioned on the tube-like section 18 and clamped between the unmovable stop 9 (radial projections 28*a*, 28*b*, 28*c*) of the cylinder 7 and the spring 8 (retaining ring) in the groove 10. The axial projections 30*a*, 30*b* of the yoke 6 are positioned between the radial projections 28*a*, 28*b*, 28*c*, 28*d* of the cylinder 7 and vice versa. Thereby, due to the retaining ring 8 (spring) the yoke-magnet arrangement (5, 6) can move slightly in axial direction x which allows a tolerance compensation due to temperature changes, for instance.

In other words, the third embodiment has a single wave retaining ring 8 as the spring and a single piece yoke 6. Via its axial projections 30*a*, 30*b* the yoke 6 extends over the entire axial extension of the magnetic ring 5 (it passes both sides of magnetic ring 5) which has a positive impact on the electromagnetic field distribution. The wave retaining ring 5 applies pressure against the groove wall 26 in the cylinder 7, and against the yoke-magnet-arrangement forcing the magnetic ring 5 against the unmovable stop 9, in particular against the yoke 6, from its shoulder 16 to the magnetic ring 5 and via the magnetic ring 5 to the unmovable stop 9. Since the yoke 6 does not have a right shoulder, the magnetic ring 5 is in direct contact with the unmovable stop 9.

According to a fourth embodiment of the movable system 4, shown in FIGS. 5*a* to 5*d*, the yoke-magnet-arrangement includes a single piece yoke 6 as well. The yoke-arrangement and the cylinder 7 are configured according the second embodiment, i.e. the cylinder 7 has a several radial projections 28*a*, 28*b*, 28*c*, 28*d* as the unmovable stop 9 which are distributed evenly over the circumference of the cylinder 7, and the yoke 6 has at its front face a plurality of axial projections 30*a*, 30*b* defining recesses 32*a*, 32*b* between them. In this case, four radial projections 28*a*, 28*b*, 28*c*, 28*d*, four axial projections 30*a*, 30*b* and four recesses 32*a*, 32*b* are provided as well. The recesses 32*a*, 32*b* have such an extension in circumferential direction that the radial projections 28*a*, 28*b*, 28*c*, 28*d* of the cylinder 7 can be inserted during assembly. An axial extension of a receiving area formed by the tube-like section 18 for the magnetic ring 5 is less than an axial extension of the magnetic ring 5 such that in an assembled state a gap 24 is established between the unmovable stop 9 and the yoke 6.

In contrast to the third embodiment, the cylinder 7 does not have an annular groove 10 for receiving a retaining ring as the spring 8. According to the fourth embodiment, the spring 8 is a wave ring which is positioned on the outer surface of the cylinder 7 and is held in place via an insert 11 acting a spring support. The insert 11 has a ring-like shape with a radial outer shoulder 34 and a radial inner ring element 35 which extends in the interior of the cylinder 7 and against which a piston spring 36 is pressed. Through the use of the piston spring 36, the insert 11 is fixed on the cylinder 7. Since the piston spring 36 is much stronger than the spring 8 holding the yoke-magnet-arrangement, the spring 8 is quasi fixed axially on the cylinder 7. During thermal expansion of the yoke-magnet-arrangement, the spring 8 won't move backwards due to the strong piston spring.

In the assembled state, the magnetic ring 5 is positioned on the tube-like section 18 and clamped between the unmovable stop 9 (radial projections 28*a*, 28*b*, 28*c*, 28*d*) of the cylinder 7 and the spring 8 (wave ring) which is held in place via the insert 11. The axial projections 30*a*, 30*b* of the yoke 6 are positioned between the radial projections 28*a*, 28*b*, 28*c*, 28*d* of the cylinder 7 and vice versa. Thereby, due to the wave ring 7 (spring) the yoke-magnet arrangement (5, 6) can move slightly in axial direction x which allows a tolerance compensation due to temperature changes, for instance.

In other words, the third embodiment does not need any cylinder groove. Instead of a cylinder groove, an insert 11 is provided for supporting the spring 8. The insert 11 is releasably fixed to one side of the cylinder 7. In addition, since no groove is needed for keeping the spring 8 in place on the cylinder 7, the spring 8 can be a closed wave ring. Furthermore, the insert 11 acts as centering device for the wave ring (spring 8) on the cylinder 7.

It should be noted that also the first, second and third embodiments can be equipped with the insert 11 instead of providing a cylinder groove 10.

A linear compressor for a household appliance, for instance a refrigerator, is disclosed, wherein a yoke-magnet-arrangement is clamped on a cylinder of a cylinder-piston arrangement in such a way that temperature expansions of the yoke-magnet-arrangement are enabled, in particular by forcing the yoke-magnet-arrangement via a spring force against a fixed stop of the cylinder. A household appliance having the linear compressor is also disclosed.

The following is a summary list of reference numerals and the corresponding structure used in the above description of the invention:

1 linear compressor
2 stator
3 coil
4 movable system
5 magnet ring
6 yoke
7 cylinder
8 spring
9 unmovable stop
10 annular groove (cylinder grove)
11 insert
12 piston
13 chamber
15 circled area
16 shoulder of the yoke
18 tube-like section
20 tube-like section
22 shoulder of the yoke
24 gap between yoke parts
26 groove wall
**28*a*, 28*b*, 28*c*, 28*d*** radial projection
**30*a*, 30*b*** axial projection
**32*a*, 32*b*** recess
34 shoulder of the insert
35 inner ring element
36 piston spring

The invention claimed is:

1. A linear compressor for a household appliance, the linear compressor comprising:

a linear electric motor including a stator with a coil, and a movable system being movable in an axial direction;

said movable system including a yoke-magnet-arrangement, a cylinder having an unmovable stop, and a spring;

said yoke-magnet-arrangement including an annular yoke disposed on said cylinder and a magnetic ring carried by said annular yoke;

said yoke-magnet-arrangement being pressed by said spring against said unmovable stop limiting an axial movement of said yoke-magnet-arrangement on said cylinder at one side; and said yoke having a shoulder facing said unmovable stop and limiting an axial movement of said magnetic ring on said yoke at another side.

2. The linear compressor according to claim 1, wherein said spring acts directly on said yoke.

3. The linear compressor according to claim 1, wherein said spring is a ring having a wave shape.

4. The linear compressor according to claim 1, wherein said spring is a retaining ring and is disposed in a cylinder groove.

5. The linear compressor according to claim 1, which further comprises an insert surrounding said cylinder and acting as a spring support, said spring being a ring held in place by said insert.

6. The linear compressor according to claim 1, wherein said yoke is split into two annular yoke parts each having a shoulder for limiting an axial movement of said magnetic ring.

7. The linear compressor according to claim 6, wherein said magnetic ring has an axial extension, and said two annular yoke parts are configured to be put together to form a receiving area for said magnetic ring, said receiving area having an axial extension being less than said axial extension of said magnetic ring.

8. The linear compressor according to claim 1, wherein said magnetic ring has an axial extension, and said yoke has a tube-shaped section for receiving said magnetic ring, said tube-shaped section having an axial extension being less than said axial extension of said magnetic ring.

9. The linear compressor according to claim 1, wherein:

said cylinder has radial projections being spaced apart from one another in a circumferential direction and forming said unmovable stop on said cylinder; and said yoke has a tube-shaped section with a front face and axial projections at said front face being adapted to be passed between said radial projections of said cylinder.

10. The linear compressor according to claim 9, wherein said magnetic ring has an axial extension, and said tube-shaped section for receiving said magnetic ring has an axial extension being less than said axial extension of the magnetic ring.

11. A household appliance, comprising a linear compressor according to claim 1.

* * * * *